United States Patent
Moon et al.

(10) Patent No.: US 6,433,801 B1
(45) Date of Patent: Aug. 13, 2002

(54) METHOD AND APPARATUS FOR USING A TOUCH SCREEN DISPLAY ON A PORTABLE INTELLIGENT COMMUNICATIONS DEVICE

(75) Inventors: Billy G. Moon, Apex; Brian Bankler, Cary; Tammy A. Wooldridge, Raleigh; Vikas Jain, Durham, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/938,510

(22) Filed: Sep. 26, 1997

(51) Int. Cl.[7] .................................................. G06F 3/14
(52) U.S. Cl. ....................... 345/840; 345/777; 345/815; 345/841
(58) Field of Search ................................ 345/352, 353, 345/354, 334, 339, 342, 347, 348, 349, 350, 357, 169, 173, 146, 810, 815, 826, 835, 839, 840, 841, 764, 765, 769, 770, 776, 777, 854, 864

(56) References Cited

U.S. PATENT DOCUMENTS 4,649,499 A   3/1987  Sutton et al.
4,914,624 A * 4/1990  Dunthorn ..................... 345/173

(List continued on next page.)

FOREIGN PATENT DOCUMENTS

EP    0331329 A1   6/1989
EP    0 664 504 A2  7/1995

(List continued on next page.)

OTHER PUBLICATIONS

Xerox PARCTAB Mobile Hardware, Jun. 12, 1995, pp. 1–2.
Xerox 5437 User Guide, Rank Xerox Limited, Copyright 1996, pp. 1–12 through 1–17.
Corel (RTM) Wordperfect (RTM) 8 ® 1997 4 pp.
www.ingrid.org/pilotfaq/970620/org/3.htm; 4 pp.
http://www.psion.com/series5/index.html3pp.

*Primary Examiner*—Crescelle N. dela Torre
(74) *Attorney, Agent, or Firm*—Coats & Bennett, P.L.L.C.

(57) ABSTRACT

A portable intelligent communications device is provided which includes a cellular telephone and a computer-controlled touch screen display. The touch screen display is a high-resolution graphics display which acts as a graphical user interface. Since the touch screen display is smaller in size than a standard laptop computer's display, the information boxes and menu selections are re-sized so as to fit on the smaller screen, however, each of the choices is made large enough in surface area so that a human finger can tactilely operate the touch screen display without the need of a more precise pointing device. Instead of using pull-down menus or drop down lists, the graphical user interface provides a selection list based upon virtual control buttons and virtual "image buttons" in which each image button is labeled to describe the option that can be selected by pressing that button. In situations where touching a control button opens a second level of the menu, this second level of menu choices (or "image buttons") is either docked adjacent to the display's work area, or is launched as a floating window on top of the work area. The user also may reconfigure the control buttons which are provided as a tabbed panel for easy actuation on the touch screen display. Rather than providing a fixed pull-down menu set of choices, the display shows a series of file folders having tabs that are displayed at different horizontal locations on the screen. The user can drag and drop the tabs (i.e., the control buttons) so that these controls can be re-ordered. In addition, the user may wish to change the entire grouping and move a control button from an old control panel to a completely new panel. When this occurs, the new panel is automatically created. Furthermore, the user can drag a control button from one control panel area of the screen and drop the control button into the "tab area" of the control panel at a location where no tab previously existed. When that occurs, a new tab is automatically created having the same name as the original control button.

32 Claims, 12 Drawing Sheets

U.S. PATENT DOCUMENTS

| | | | | |
|---|---|---|---|---|
| 5,119,079 A | * | 6/1992 | Hube et al. | 345/823 |
| 5,140,678 A | * | 8/1992 | Torres | 345/777 |
| 5,565,888 A | * | 10/1996 | Selker | 345/823 |
| 5,625,783 A | | 4/1997 | Ezekiel et al. | |
| 5,627,567 A | * | 5/1997 | Davidson | 345/173 |
| 5,678,014 A | * | 10/1997 | Malamud et al. | 345/835 |
| 5,745,718 A | * | 4/1998 | Cline et al. | 345/777 |
| 5,748,184 A | * | 5/1998 | Shieh | 345/173 |
| 5,784,060 A | | 7/1998 | Bertram et al. | 345/840 |
| 5,801,941 A | * | 9/1998 | Bertram | 700/83 |
| 5,805,157 A | * | 9/1998 | Bertram et al. | 345/773 |
| 5,818,451 A | * | 10/1998 | Bertram et al. | 345/840 |

FOREIGN PATENT DOCUMENTS

| | | |
|---|---|---|
| GB | 2229301 A | 9/1990 |
| GB | 2301217 A | 11/1996 |
| GB | 2 324 232 A | 10/1998 |
| JP | 09-0018931 | 1/1997 |

\* cited by examiner

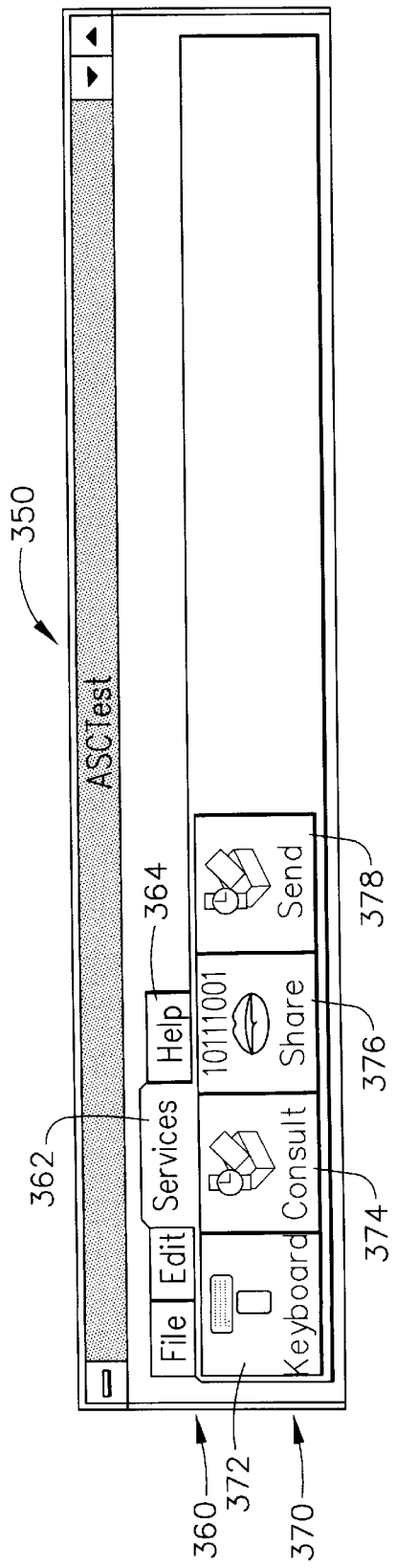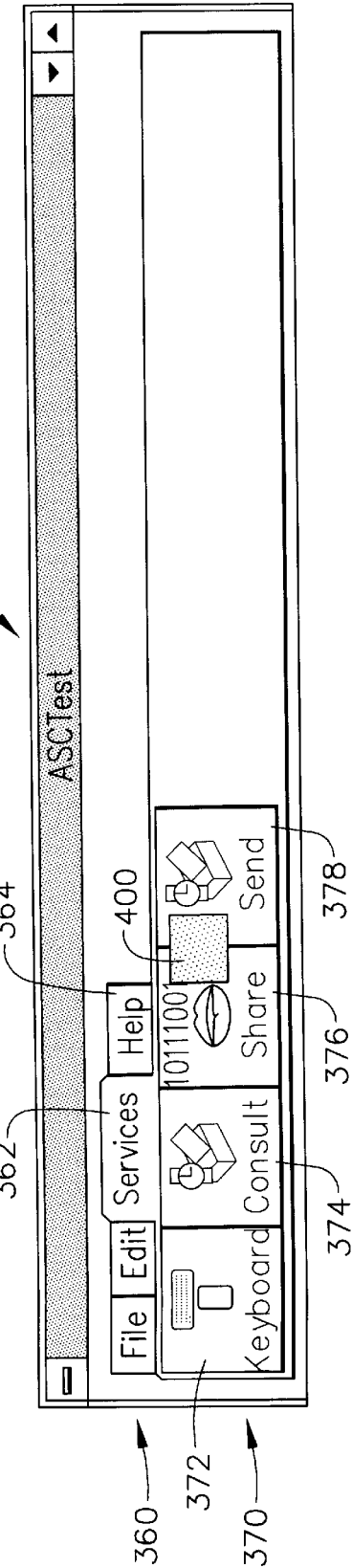

METHOD AND APPARATUS FOR USING A TOUCH SCREEN DISPLAY ON A PORTABLE INTELLIGENT COMMUNICATIONS DEVICE

BACKGROUND OF THE INVENTION

1. Field of the Invention

The present invention relates generally to mobile communications equipment and is particularly directed to a cellular telephone of the type which includes a computer-controlled graphics display. The invention is specifically disclosed as a portable intelligent communications device that has a touch screen display in which the graphics user interface displays choices as "tabs" or "image buttons" that are physically large enough to be actuated by a human finger.

2. Description of Related Art

Various types of portable laptop computers have been available for many years, and their flat panel displays typically run in a Windows™ environment as the graphics user interface. Windows-compatible computer programs that execute on laptop computers typically use pull-down menus so the user can select from various choices to operate the executing program, and many times choices will be presented to the user using a drop down list in which the user can type in certain information, such as operating parameters or filenames. In using these pull-down menus or drop down lists, the user of a laptop computer must typically have a pointing device, such as a mouse or a controlled cursor that moves across the screen. Most drop down lists will present an expanded list of choices if the user clicks the pointing device on a down arrow within the vertical scroll bar of a smaller window, in which the choices will be presented.

In a complex computer system, displaying all of the menu choices and control panels selections of interest to the user at one time may require an inordinate amount of display real estate, especially for portable computers with limited display sizes, such as in laptop computers. For portable computers having case sizes even smaller than laptop computers, the relatively small size of the associated graphics display will require some changes to the "normal" method of displaying menus and control panels, which may tend to make such displays even smaller and more concentrated.

Portable telephones, particularly cellular telephones, have also been available for years. Most such equipment is computer controlled, in which the cellular phone includes a microprocessor or other processing control unit, along with sufficient random access memory to store some of the parameters that can be selected by the phone's user. Some telephones include a relatively small liquid crystal display which can show various types of information, including the telephone number being dialed, and/or the telephone number of a call being received. Such displays are typically limited to alphanumeric characters, and do not lend themselves well to displaying graphical data or images.

It would be desirable to provide a portable telephone with a high-resolution graphics display in order to make better use of the processing power that is available when including a microprocessor within the portable telephone. Such a device could be configured to run computer programs that are comparable to Windows-type software in the form of word processors, spreadsheets, and other communications software such as a web browser.

SUMMARY OF THE INVENTION

Accordingly, it is a primary object of the present invention to provide a portable intelligent communications device that has the capability of acting as a cellular telephone and as a laptop computer.

It is another object of the present invention to provide a portable intelligent communications device that includes a cellular telephone and a high-resolution graphics display screen that is touch sensitive, and so can be used without a pointing device such as a mouse.

It is a further object of the present invention to provide a portable intelligent communications device that acts as a cellular telephone and includes a touch screen display in which the target areas for selection by a user are increased to a size sufficient that a person's finger can be used to make the selections.

It is yet another object of the present invention to provide a portable intelligent communications device that includes a cellular telephone and a touch screen display, in which a menu system that supports finger based navigation is provided, and a graphical user interface is provided that consists of virtual tabs and image buttons that can be selected by a human finger.

It is yet a further object of the present invention to provide a portable intelligent communications device that includes a cellular telephone and a touch screen display which is capable of moving and automatically naming tabbed control panels based upon control names.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved portable intelligent communications device is provided which includes a portable or cellular telephone and a computer-controlled touch screen display. The touch screen display is a high-resolution graphics display, and while it is smaller in size than a standard laptop computer display, the touch screen display of the present invention acts as a graphical user interface in which various executable computer programs can be accessed and executed on the portable intelligent communications device. A microprocessor controls the graphics display, and also controls a modem that communicates with the transmitter/receiver portion of the cellular telephone. Under control of the microprocessor, the portable intelligent communications device can communicate over the Internet by use of a web browser program resident in the portable intelligent communications device.

Since the touch screen graphics display is smaller in size than a standard laptop computer's display, the information boxes and menu selections are re-sized so as to fit on the smaller screen, but at the same time, each of the choices is made large enough in surface area so that a human finger can tactilely operate the touch screen display without the need of a more precise pointing device (such as a mouse). Instead of using pull-down menus or drop down lists (as in most Windows-type interfaces), the graphical user interface of the present invention provides a selection list based upon virtual "image buttons" in which each image button is labeled to describe the option that can be selected by pressing that button. Each button has a sufficiently large target area that can be easily pressed using a human finger, which not only makes it easier to use finger-based navigation, but also provides the user with a visual cue.

The menu system of the present invention is actuated by the use of virtual tabs (or control buttons) and virtual image buttons, which have been appropriately sized to support finger touches on the touch screen display. In situations where touching a tab or control button opens a second level of the menu (often called a "dialog"), this second level of menu choices is either docked adjacent to the display's work area, or is launched as a floating window on top of the work area. This is quite different from prior menu applications that use Windows™, which typically cascade their second level of menu choices with the control button at the top of the opened window.

Another aspect of the present invention allows the user to reconfigure the control buttons which are provided as a tabbed panel for easy actuation on the touch screen display. Rather than providing a fixed pull-down menu set of choices, the display shows a series of file folders having tabs that are displayed at different horizontal locations on the screen. The user of the portable intelligent communications device can drag and drop the tabs (i.e., the control buttons) so that these controls can be re-ordered. In addition, the user may wish to change the entire grouping and move a control button from an old control panel to a completely new panel. When this occurs, the new panel is automatically created. Furthermore, the user can drag a control button from one control panel area of the screen and drop the control button into the "tab area" of the control panel at a location where no tab previously existed. When that occurs, a new tab is automatically created having the same name as the original control button.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 10 depicts a graphical user interface provided with the portable intelligent communications device of FIG. 1, in which a control panel having a tab area is displayed.

FIG. 11 depicts a graphical user interface provided with the portable intelligent communications device of FIG. 1, in which a dialog is selected using a drag mode of the touch screen display.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
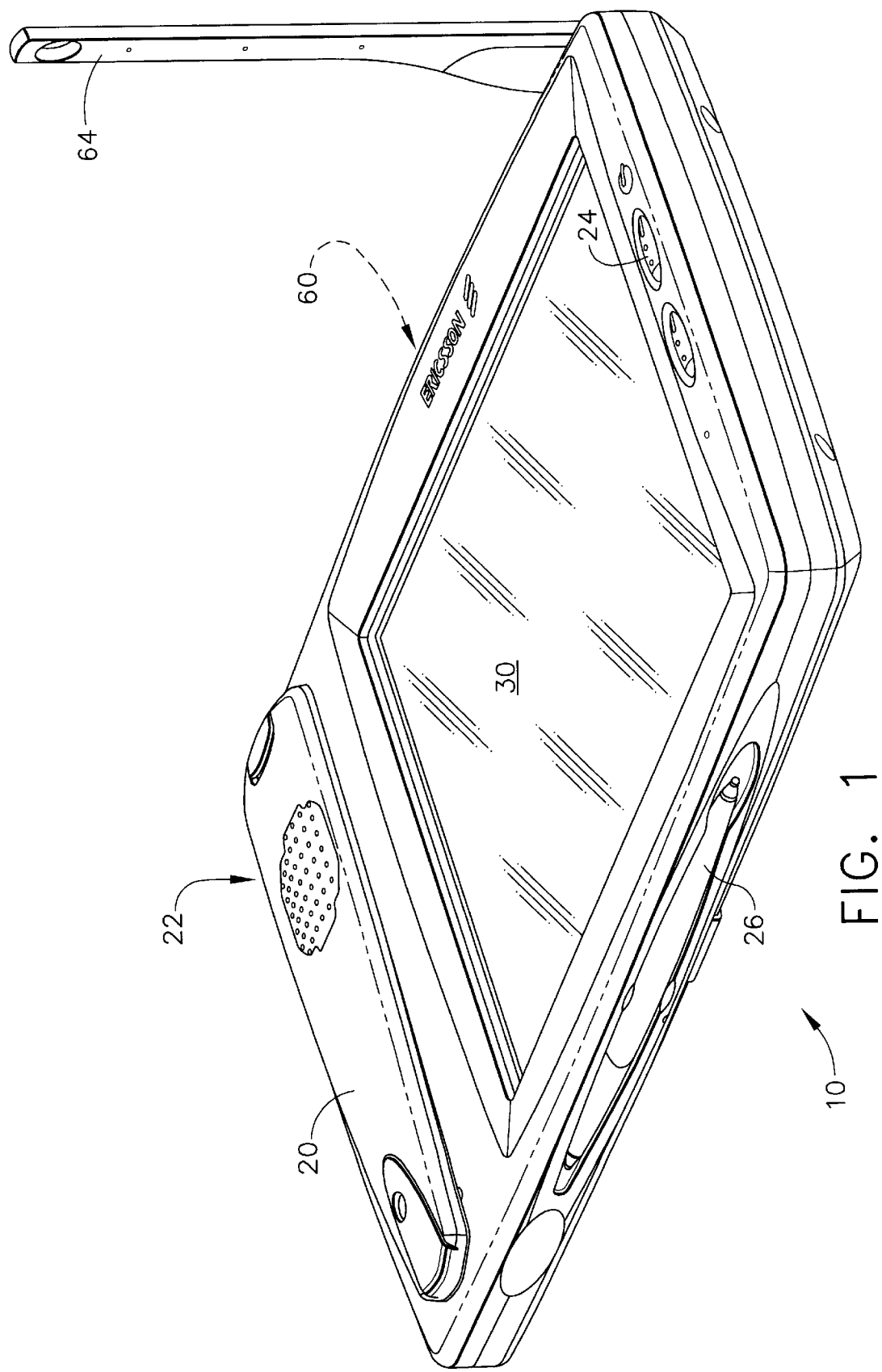
FIG. 1 is a right-hand, frontal perspective view of a portable intelligent communications device, as constructed according to the principles of the present invention.

Referring now to the drawings, FIG. 1 shows a portable intelligent communications device generally depicted by the reference numeral 10. Some of the major components include a telephone handset 20, a speaker 22, optional control buttons 24, an optional stylus 26, and a touch screen display 30. Along the far side of portable intelligent communications device 10 is an antenna 64, and various plug-in ports (not shown), including optional personal computer card ports, an optional keyboard port, and an optional telephone land-line connector (depicted in dashed lines at 60). Portable intelligent communications device 10 preferably is no larger than a standard business desk telephone, and the touch screen display 30 is preferably a rectangular display having a pixel density of at least 640 by 480 pixels, and a size of around eight (8) inches across its diagonal.

Figure 2:
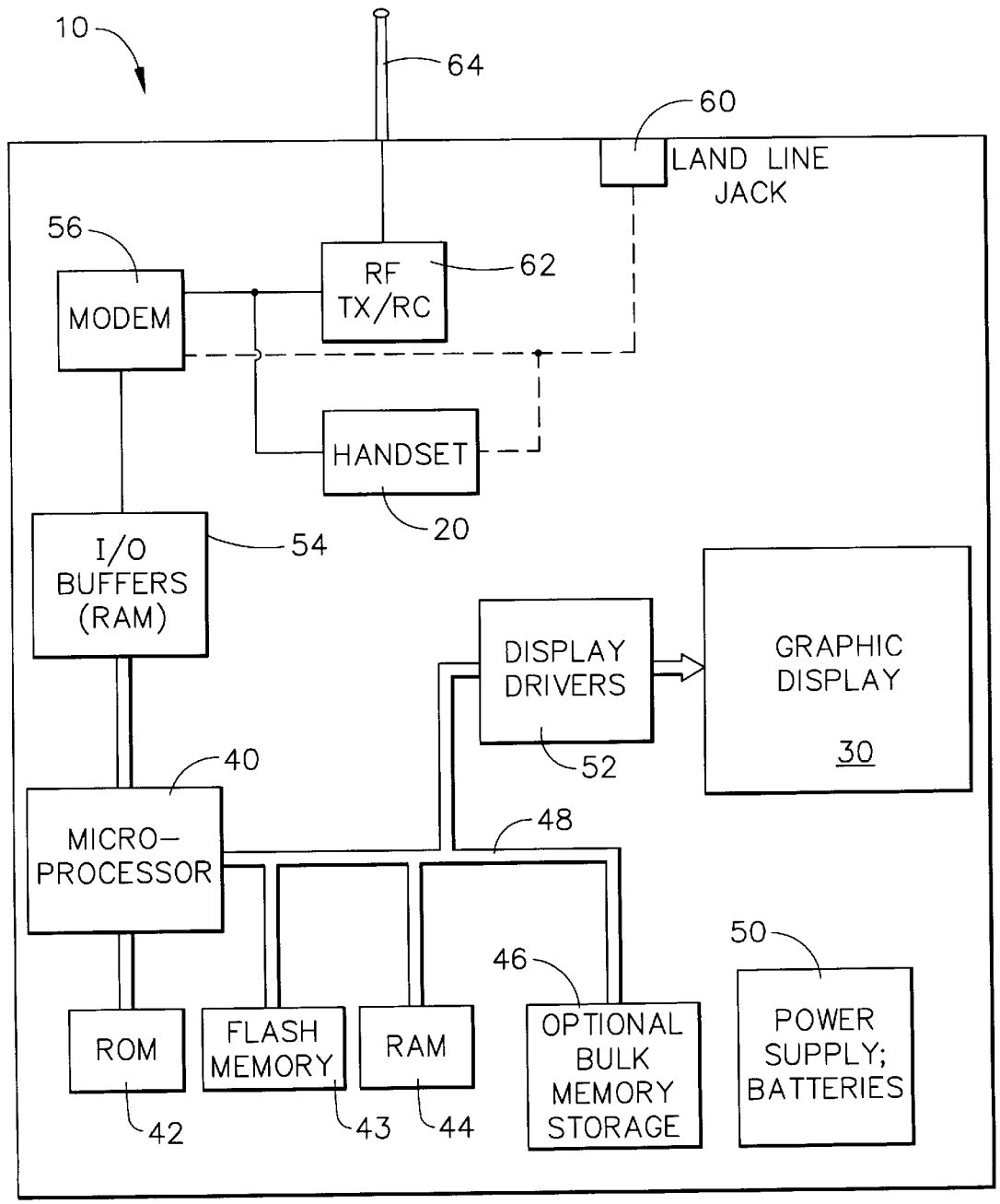
FIG. 2 is a block diagram of the major components of the portable intelligent communications device of FIG. 1.

In FIG. 2, the major components of the portable intelligent communications device 10 are depicted in a block diagram format. A microprocessor 40 preferably is provided in the portable intelligent communications device to control the various operations of the data being transferred into or out of the portable intelligent communications device, and to control the graphic display 30. As in most computer-based systems, microprocessor 40 will communicate with other components over a bus system 48, which typically includes address lines, data lines, and control lines. Bus system 48 connects microprocessor 40 to read only memory (ROM) 42, user changeable non-volatile "flash" memory (e.g., an EPROM circuit) 43, random access memory (RAM) 44, and an optional bulk memory storage device 46, such as a hard disk drive. A power supply 50 is also provided, which typically would be energized by batteries. Microprocessor 40 is also connected to a display driver circuit 52, which controls the images that are emitted by the graphic display 30.

Microprocessor 40 communicates with a set of input/output buffers 54, which may be separate hardware components, or may be part of the main system RAM 44. The I/O buffers 54 are connected to a modem 56, which in turn is connected to the handset 20. Modem 56 is also optionally connected to a land line connection (e.g., via land line jack 60), which would enable the portable intelligent communications device 10 to directly be plugged into a telephone line via a wall jack. Modem 56 is also connected via a matrix switch (not shown) to a radio frequency transmitter/receiver unit 62, which in turn is connected to antenna 64. An exemplary portable intelligent communications device is disclosed in a co-pending patent application entitled, "Switching of Analog Signals in Mobile Computing Devices," and having the Ser. No. 08/796,119, which is owned by the assignee of the present invention, and hereby is incorporated by reference herein.

As will be understood by one of ordinary skill in the art, portable intelligent communications device 10 can be configured to act as a very powerful and versatile piece of communications equipment, and with the proper software, also can act as a portable computer having a flat-panel display. With sufficient RAM and a mediumsize hard disk drive, the portable intelligent communications device 10 could act as a Windows-based personal computer platform, and could run the standard Windows-based computer programs, such as Microsoft Word™. However, since the graphic display 30 is physically smaller than most monitor screens that are provided with personal computers or laptop computers, the standard Windows-based computer programs and graphical user interface systems may not be easily used without some modifications.

Figure 3:
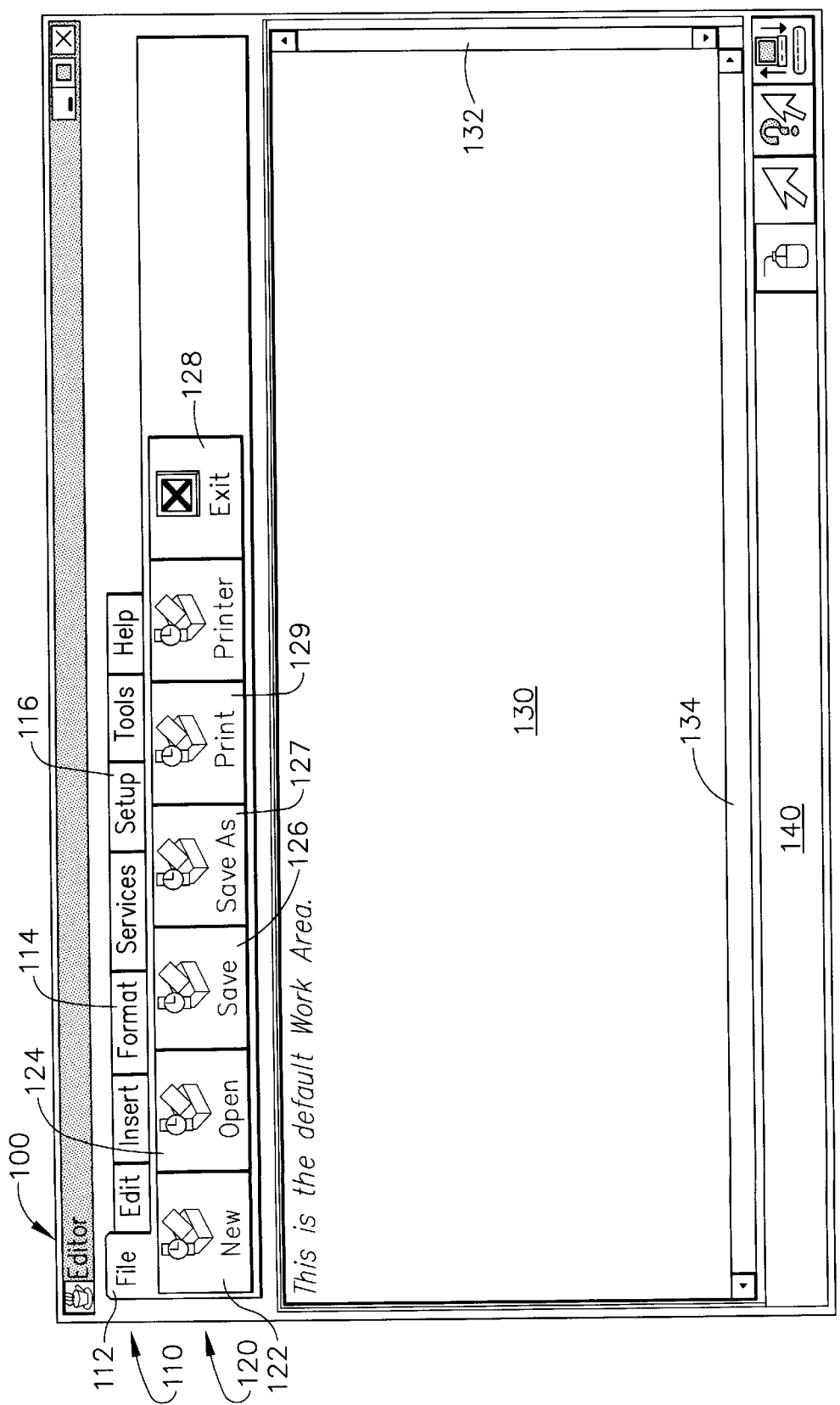
FIG. 3 depicts a graphical user interface display provided with the portable intelligent communications device of FIG. 1, showing some of the tabbed panel menu areas and a work area with no docking dialog.

In the present invention, the menu choices for the graphical user interface are provided with a windowing-type environment, which can be achieved through a docking of dialogs, information boxes and keyboard symbols. This will drastically reduce clutter and confusion for the user when using the portable intelligent communications device's windowing environment. For example, FIG. 3 depicts a graphical user interface (not to scale) preferably provided with portable intelligent communications device 10, which in this example acts as a text editor or word processor. The title of the computer program, "Editor," is located in the top window title bar at reference numeral 100, just like in other standard Windows-based application programs. The standard control buttons are also located along the right-hand side of this top window title bar.

The main control panel is depicted at reference numeral 110, as a tab area having a series of virtual tabbed selections, such as "File" at 112, "Format" at 114, and "Setup" at 116, as some of the choices. Options displayed in this manner will be referred to hereinbelow as "tab control panels," or as a "tab menu area."

After one of the virtual tabs has been selected by the user, a second level of menu choices, known as "dialogs" will now appear on the display, as seen at reference numeral 120. As used herein, the term "dialog" does not necessarily refer to a pop-up display, but could instead be docked somewhere else within existing windows. In the example display of FIG. 3, the user has selected the "File" tab at 112, which brings forth the second level menu choices, such as "New" at 122, "Open" at 124, "Save" at 126, etc., finally ending with a dialog called "Exit" at 128. As will be understood by one of ordinary skill in the art, these dialogs provide the same functions as pull-down menu choices that appear on a standard Windows-based word processing program, which provides menu choices, such as "File."

A "work area" at reference numeral 130 is provided which, in the case of a word processor or text editor, would include the image of a document that is being created or edited. As in most word processing computer programs, the size of the "window" that shows the actual contents of the document being edited is much too small to display the entire document at one time. Consequently, there is a vertical scroll bar at 132, and a horizontal scroll bar at 134. These scroll bars operate in the same manner as the equivalent vertical and horizontal controls for a Windows-based word processing program. The bottom rectangular area at reference numeral 140 will preferably be used to display status information.

Another advantage of the portable intelligent communications device of the present invention is that its graphical user interface is designed to be operated by touch-navigation, meaning that the human finger can be placed directly on the menu item choice of interest, which will have an identical effect as if a mouse or other pointing device were used to make the menu selection choice. The shape and size of the control buttons and the tabs are such that a human finger can select the appropriate control button (or tab) without flowing over onto an adjacent control button. Since the relatively small size of the graphic display 30 will not allow as large a menu set of choices as a standard laptop computer's display, the graphical user interface of the present invention must be intelligently designed to provide the appropriate controls and options while still having these controls spaced appropriately for finger navigation. While finger navigation is the preferred mode of operation for portable intelligent communications device 10, a stylus or light pen 26 may optionally be provided so that a user may make selections on display 30 with somewhat greater accuracy, if desired.

Figure 4:
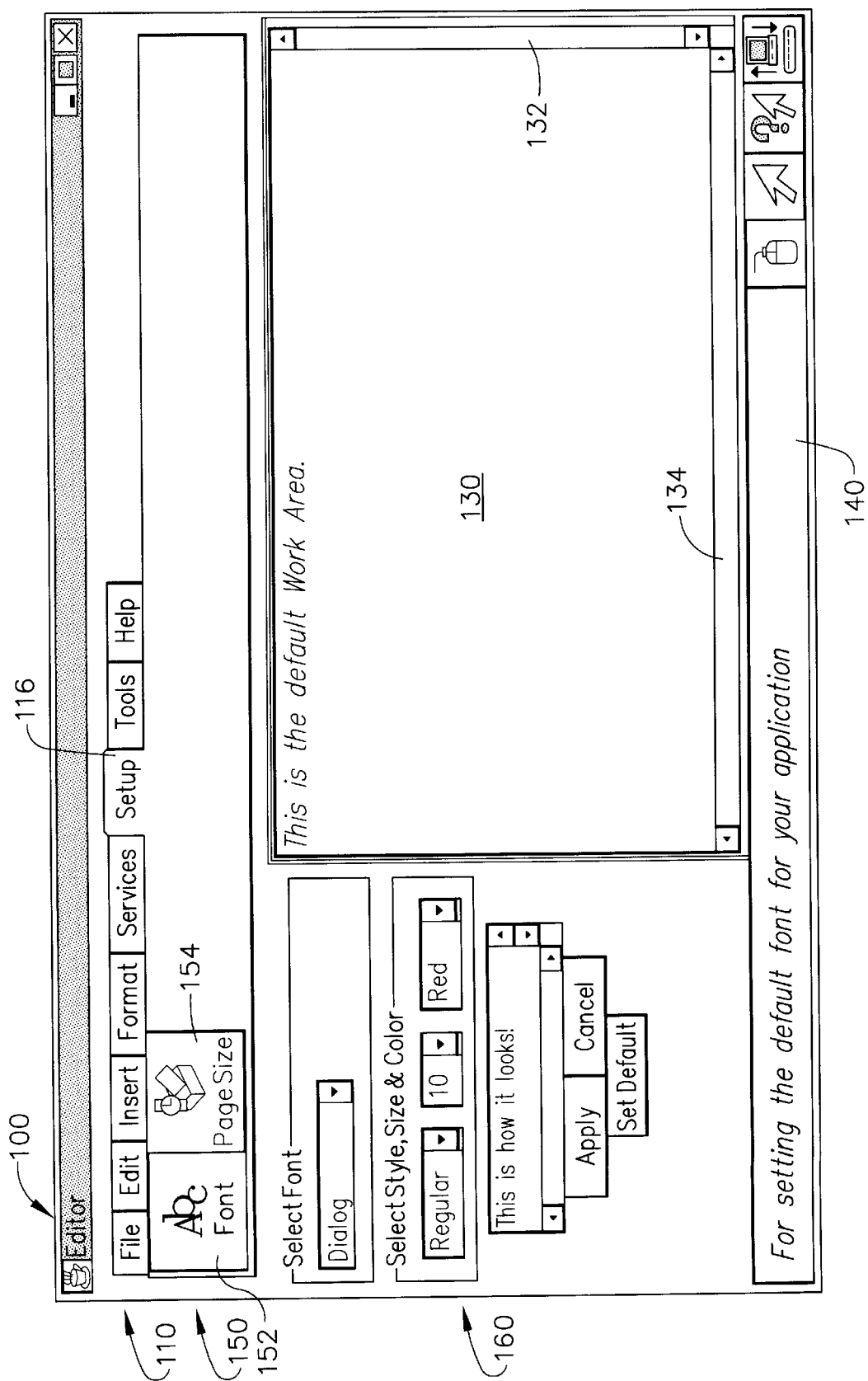
FIG. 4 depicts a graphical user interface display provided with the portable intelligent communications device of FIG. 1, in which a submenu panel is docked along the western side of the work area.

FIG. 4 depicts the graphical user interface after the "Setup" tab 116 has been chosen by the human user. When this Setup choice is made, a second menu layer of dialogs is displayed, at reference numeral 150, in which the two choices are virtual image buttons (which will invoke "dialogs") labeled as "Font" at 152, and "Page Size" at 154. In the illustrated example of FIG. 4, the user now chooses the Font image button at 152, which causes a submenu panel 160 to become displayed along the "western" side of the work area 130. As can be seen by an inspection of the submenu panel 160, the Font of the text in work area 130 can be selected as well as various attributes that one would see in a Font selection menu of a standard Windows-based word processor. In the submenu panel 160, all of the controls are appropriately spaced and sized to allow finger navigation. Of course, a stylus, cursor, or mouse-based pointing device could also be used to make these selections, however, it is preferred that the controls be appropriately sized and spaced so that a person traveling can use the portable intelligent communications device's graphical user interface by finger navigation without any other hardware.

Different events occur when making different choices of the control panel image buttons 120 on FIG. 3. For example, if the Exit button 128 is touched, then no further menu action occurs, and instead the application will exit. If the "Print" button 129 is contacted by the user's finger, then no further menu action will occur, however, the active document will be printed. Another possible event is where a dialog appears in a sub-menu area, as depicted on FIG. 4, at 160.

Figure 5:
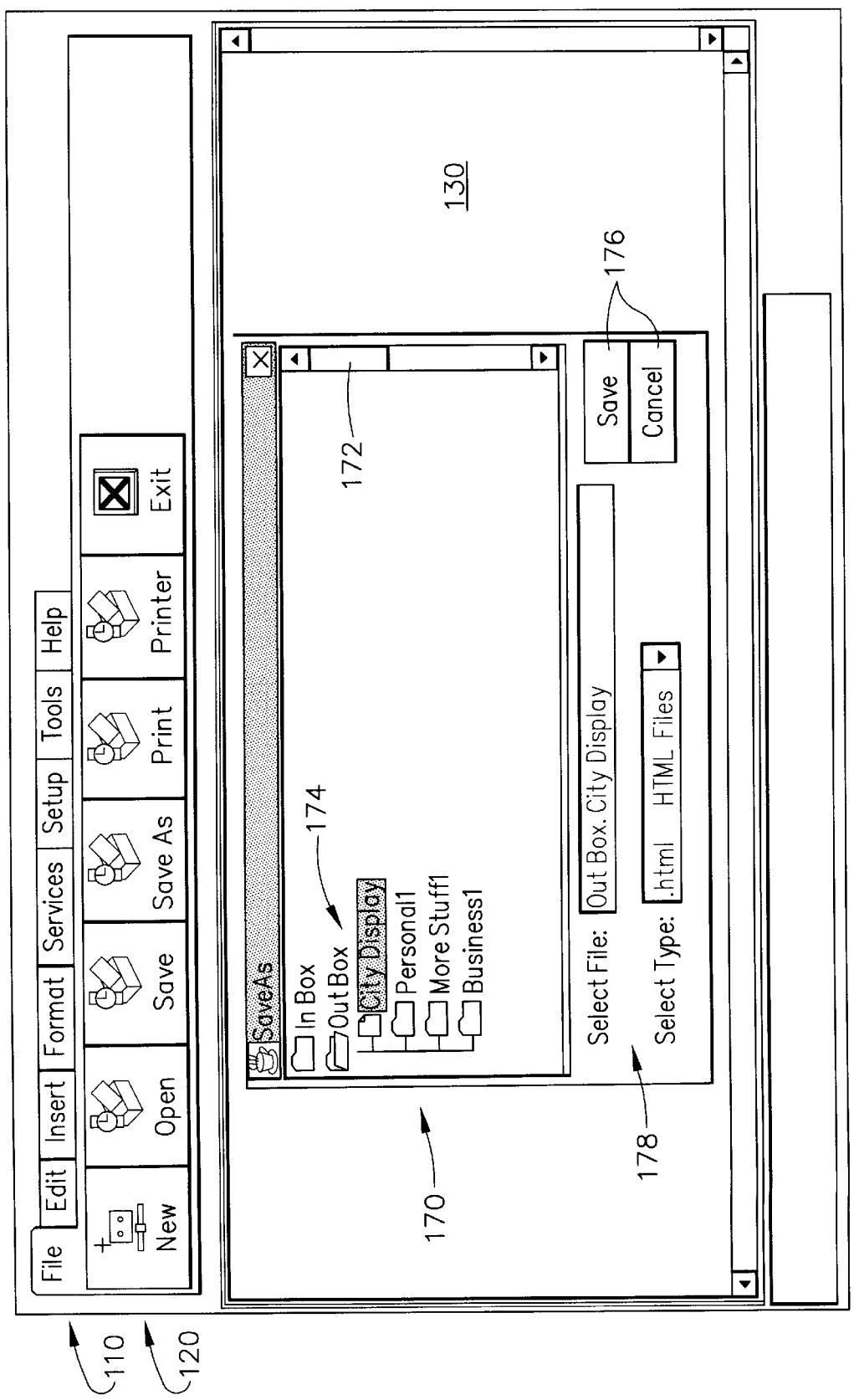
FIG. 5 depicts a graphical user interface display provided with the portable intelligent communications device of FIG. 1, in which a keyboard touch-panel is docked to the southern side of the work area.
Figure 6:
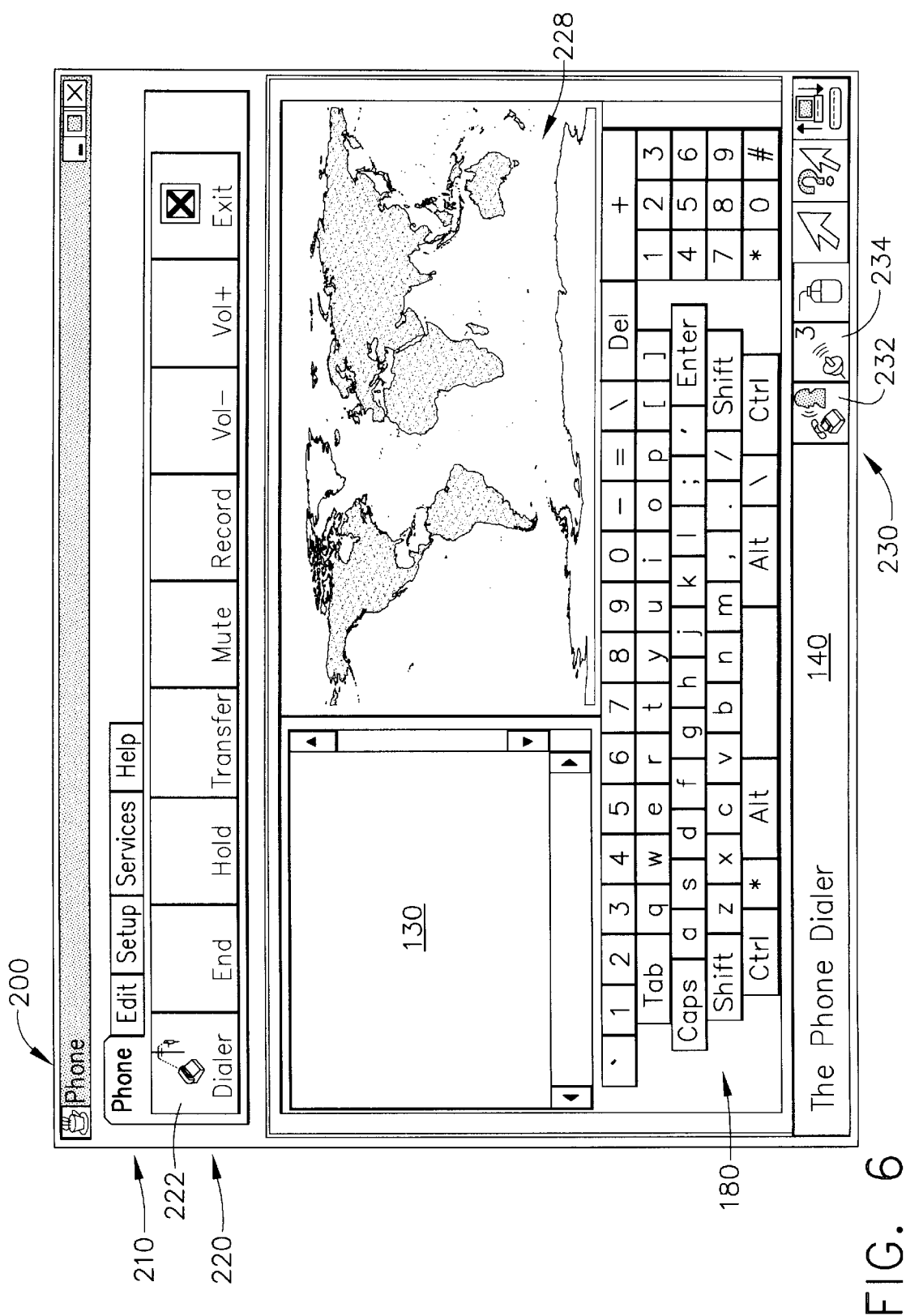
FIG. 6 depicts a graphical user interface display provided with the portable intelligent communications device of FIG. 1, in which a dialog for "saving a file" is docked on top of the work area.

Another type of action can occur, such as when the "Open" button 124 is selected, or when the "Save As" button 127 is selected. When the Save As button 127 is selected, a "floating window" will appear over the work area 130, which is docked in the work area itself. When this occurs, the graphical user interface will display a screen as depicted in FIG. 5. The floating window is depicted generally by the reference numeral 170, and it can be seen that several other submenu choices are provided within this floating window 170. A vertical scrolling bar is provided at 172, and file names that can be selected are depicted at 174. Other button-type commands or options are depicted at 176, and other small windows for entering text are also displayed at 178, which require data to be entered from a keyboard or like device. If an optional keyboard is attached to the portable intelligent communications device 10, then these boxes or windows can be entered directly from the keyboard. On the other hand, a dialog can be placed on the graphic display 30 which has the appearance and operates as a standard keyboard. This situation is depicted in FIG. 6, generally at the reference numeral 180. By proper sizing and positioning of the buttons, a standard QWERTY-keyboard can be activated by merely touching the appropriate spaces on the touch screen display 30.

On FIG. 6, the application being processed is no longer an editor, but is now an application program titled "Phone," at reference numeral 200. The corresponding tab control panel is depicted at reference numeral 210, and the corresponding submenu image buttons are depicted at 220. In the illustrated example of FIG. 6, the "Dialer" has been selected at 222, which brings up the working area 130. However, this working area is now much smaller than before.

The keyboard application is displayed at 180, as noted above, and in addition, a depiction of the globe is now displayed in a smaller window-type box at 228.

The status bar 140 includes two information "meters" at the reference numeral 230. The left-hand meter at 232 informs the user that the telephone is off-hook and available for use. The right-hand meter at 234 is a signal strength meter, providing the user with an indication of the reliability of the incoming signal on the cellular telephone built into the portable intelligent communications device 10.

As can be seen in FIGS. 5 and 6, the standard menu bars typically found in Windows-type application programs have been replaced by a tab menu area of a control panel which, when actuated by the user's finger on the touch screen display, will cause a second level of the menu in the form of image buttons to appear on the screen. Earlier conventional menu systems may physically support a touch screen, however, the user cannot use his fingers to traverse the menu system, simply because the menu system design does not take into account the limitations imposed by finger navigation. Menus used in Windows applications typically drop down where they would be hidden by the user's hand on a touch screen device. Further, menus are typically difficult for novice users to manage, because common commands are hidden below one or more menu layers, and the user must guess where such commands are hidden within the menu structure.

The new finger-based navigation menu system of the present invention allows a user to simply use his own fingers to navigate the menu. The present invention's graphical user interface consists of tabs and image buttons that are sized appropriately to support finger touches. The dialogs (i.e., the second level of menu options) are docked either adjacent to the work area or launch a floating window on top of the work area, rather than the current Windows-type implementations in which the second level of menu is vertically cascaded with the top control button.

In the present invention, the dialog prompts the user for more information, and appears either in a sub-menu area outside the working area, or floats on top of the work area. In situations where the dialog appears as a sub-menu outside the work area (e.g., see FIG. 4 where the sub-menu area is designated at 160), then the dialog will take as much area as necessary on the screen, while squeezing the work area of the application program. Of course, certain command options lend themselves better to being placed outside the work area (such as editing commands, or font or format commands) where, to invoke the command, a certain portion of text in the document appearing in the work area must be selected. Other commands can easily float on top of the work area, such as a "Save As" command, which appears, e.g., in FIG. 5.

Figure 7:
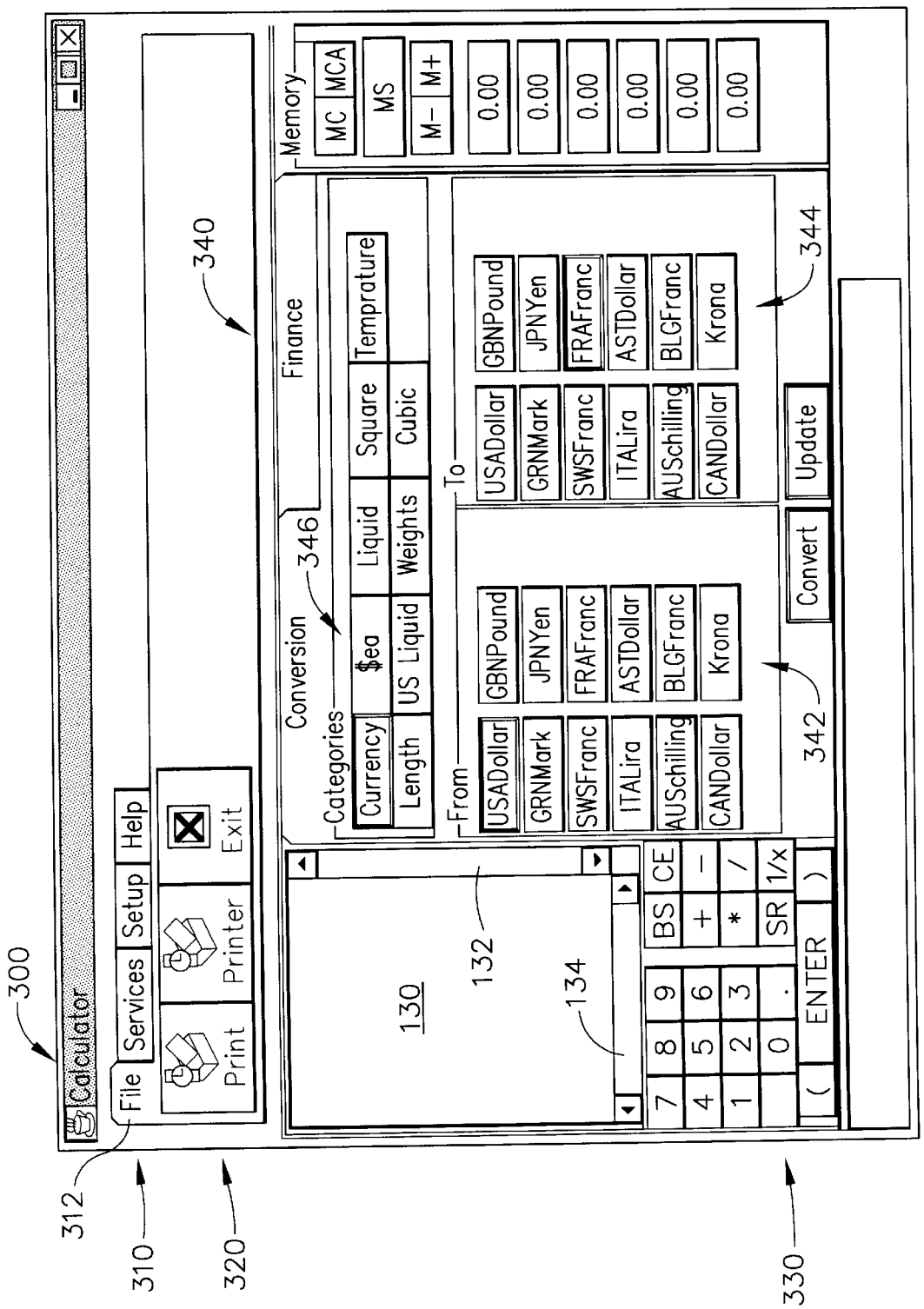
FIG. 7 depicts a graphical user interface provided with the portable intelligent communications device of FIG. 1, in which a "conversion calculator" is displayed that provides a selection list of multiple image buttons, each bearing a label representing the option that would be executed if the button is touched.

In FIG. 7, a currency conversion calculator is depicted in a sub-menu to the eastern side of the work area 130. The calculator application is titled at reference numeral 300, and its tab menu area is located at reference numeral 310. After the user has chosen the "File" tab at 312, a second level of the menu appears at numeral 320 as image buttons. A numeric keypad area at 330 is docked on the southern side of the work area 130. The currency units supported by the calculator application program are docked in a sub-menu as generally depicted by reference numeral 340. The currency units are displayed as individual image buttons that are labeled with the particular name for that currency unit. These image buttons are grouped in a "list box" which is sometimes referred to as an "IBListBox." The user can choose the currency to convert from by pressing the appropriate country's button in the "from" IBListBox at numeral 342. The user is also given a second IBListBox at 344 to choose the type of currency being converted "to." A third IBListBox at numeral 346 allows the user to inspect all of the supported conversion categories of which, on FIG. 7, the "Currency" category has been selected. As in the case of the other displays depicted in FIGS. 3–6, the image buttons on FIG. 7 are appropriately sized and spaced apart from one another to support finger navigation, while using the touch screen capabilities of graphics display 30.

Figure 8:
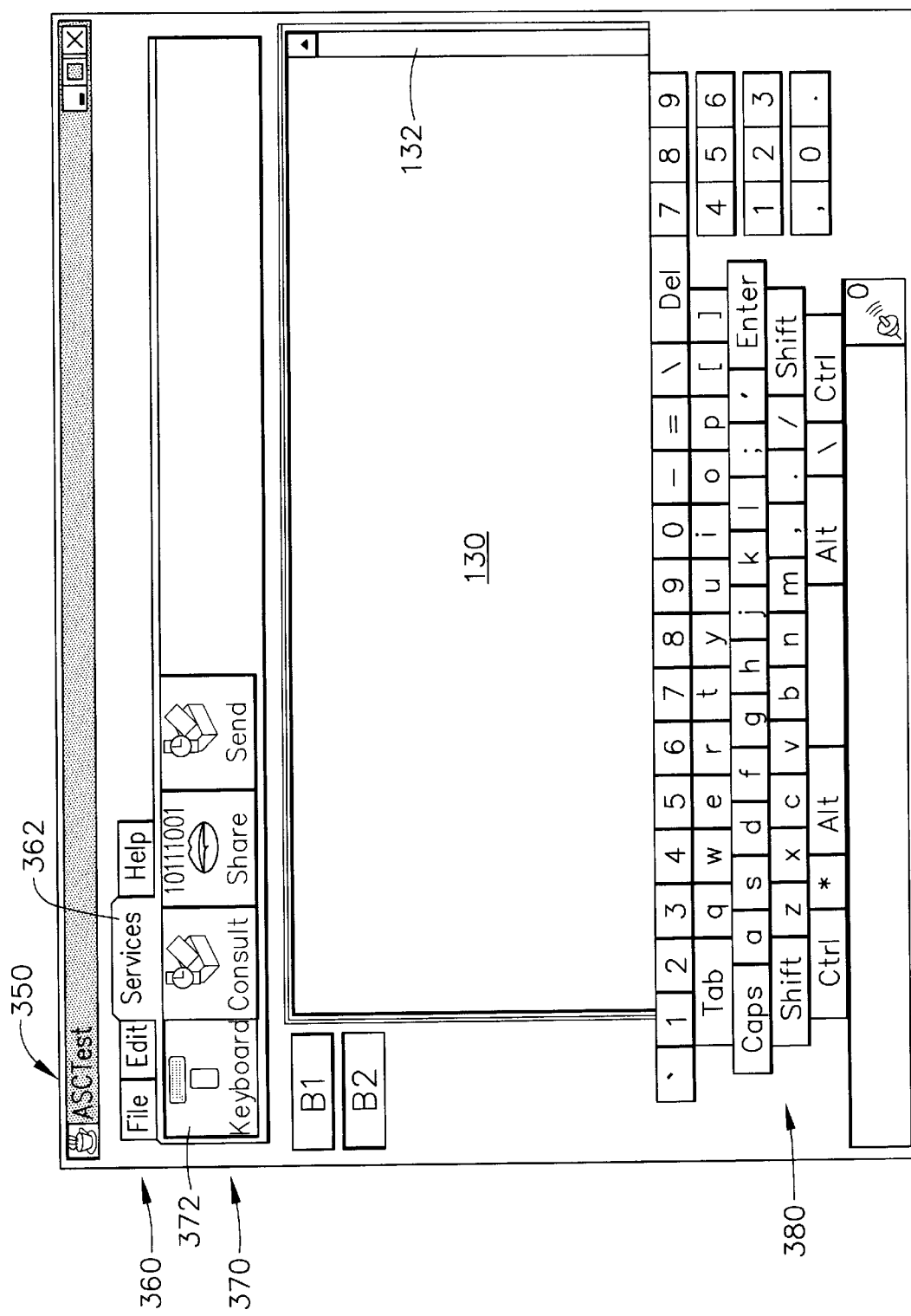
FIG. 8 depicts a graphical user interface display provided with the portable intelligent communications device of FIG. 1, in which a relatively large work area in the center of the display while a keyboard area of image buttons is docked to the southern side of the working area.

In FIG. 8, an application program called "ASCTest" is indicated on the title bar at 350. This application provides a tab menu area at 360, including a "Services" tab at 362. The sub-menu is depicted at reference numeral 370, and the "Keyboard" image button at 372 has been activated. The keyboard display is manifested along the southern side of work area 130, as shown by reference numeral 380. In this circumstance, touching the alphanumeric keys of the touch screen display 380 will cause text to appear within the work area, in a manner similar to a hardware keyboard being activated by a human user.

Figure 9:
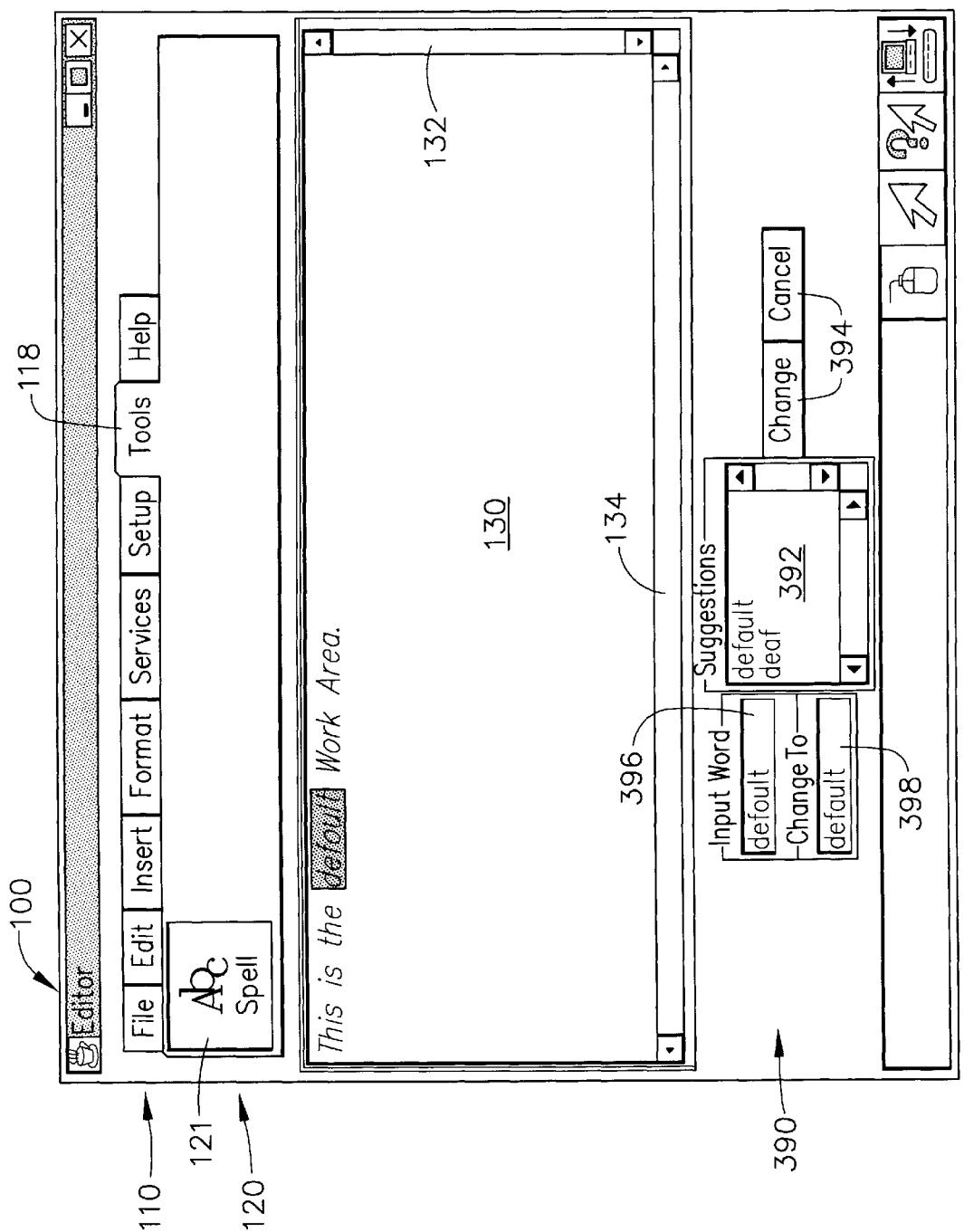
FIG. 9 depicts a graphical user interface display provided with the portable intelligent communications device of FIG. 1, in which the keyboard panel of FIG. 8 has been replaced by a "spell check" dialog.

In appropriate circumstances, the dialog can also be shown in the keyboard area, an example of which is depicted on FIG. 9. In this case, a dialog 390 has replaced the keyboard 380 that was depicted on FIG. 8. The dialog 390 docks itself in place of the keyboard, and on FIG. 9 the active dialog is a "Spell Check Dialog." Since the user may not need to use the keyboard while also using the spell checker, the former keyboard space is used to show the dialog spell checker 390.

Spell checker 390 includes a small display area at reference numeral 392, which makes suggestions for the misspelled word located at 396. The corrected word is shown in a small display at 398, and the image buttons that control the spell checker's operations are depicted at reference numeral 394. Upon activating the "Cancel" button at 394, the Spell Check Dialog 390 will disappear, and will be replaced by the keyboard 380, as per FIG. 8.

On FIG. 10, the tab menu area 360 and image buttons 370 are depicted, and the user may "drag" a dialog (i.e., image button) from one area of the screen to another. On FIG. 10, the "starting position" depicts the "Services" tab 362 as having been activated, which provides four (4) image buttons at the second menu level depicted by reference numeral 370. These four image buttons are named "Keyboard" at 372, "Consult" at 374, "Share" at 376 and "Send" at 378. Using a "drag and drop" methodology, the user can drag one of these image buttons into the tab area 360 of the depicted control panel. If the user drops the control into the existing tab area 360, then the control is moved from one tab to another. In other words, if the "Consult" control 374 was dragged onto the "Help" tab at 364, then the Consult control would be moved from the Services tab 362 onto the Help tab 364.

If, however, the user drops the control onto an empty location along the level where tabs may be resident (i.e., along the tab menu area 360), then a new tab will be automatically created having the same name assigned as originally appeared as the label of this image button. An example of how this occurs is depicted in FIGS. 11–13, and is described below.

On FIG. 11, the same four (4) image buttons are depicted as were on FIG. 10. The "Share" image button at 376 is selected using the drag mode, and this is indicated by a colored square 400 which is representative of the location where the user is currently pointing. It will be understood that the dragged image button could be depicted by use of a shaded image to show that it is being dragged, however, the preferred embodiment uses the colored square 400 to show that same circumstance.

Figure 12:
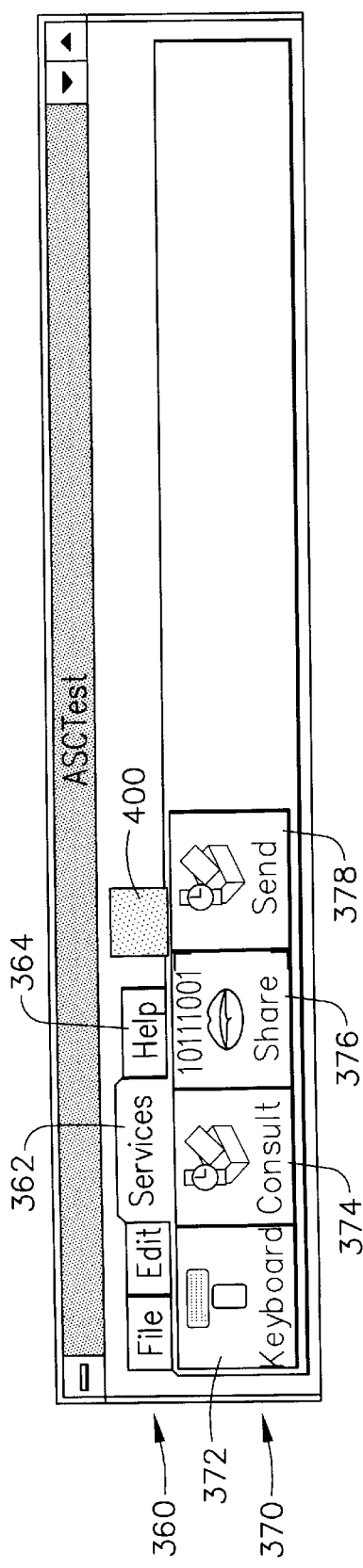
FIG. 12 depicts a graphical user interface provided with the portable intelligent communications device of FIG. 1, in which the user has dragged the selected control to the tab area of the control panel.
Figure 13:
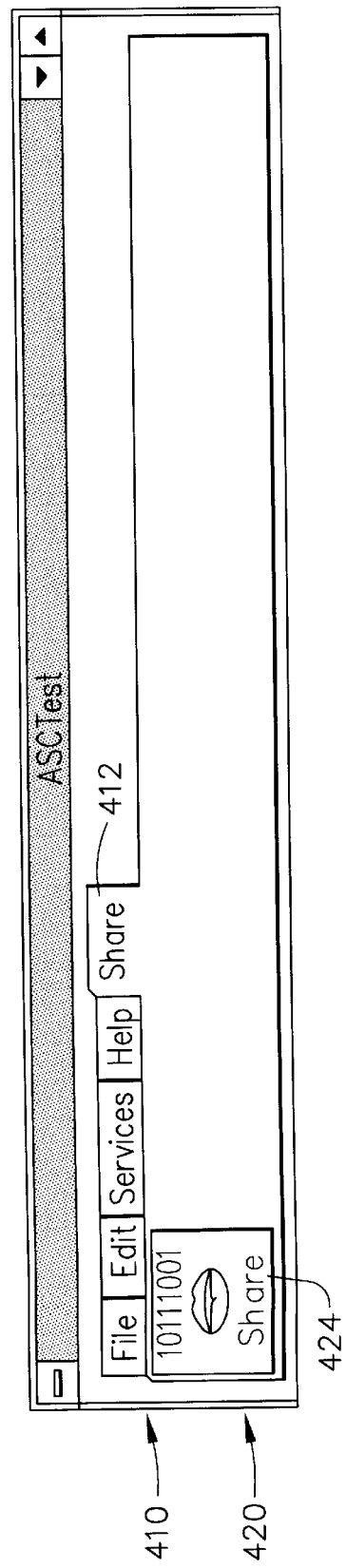
FIG. 13 depicts a graphical user interface provided with the portable intelligent communications device of FIG. 1, in which the user drops the selected control that was being dragged into the tab area of the control panel.

On FIG. 12, it can be seen that the colored square 400 has been moved into the tab menu area 360, and if the user drops the image button at this time, a new tab will be created and named after the image button that was dropped onto this tab. This can be seen on FIG. 13, in which the revised tab menu area at reference numeral 410 includes the initial four (4) tab choices, and also includes a new "Share" tab at 412. On FIG. 13, the Share tab 412 has been selected, and along the second row of the control panel at 420, a new "Share" image button is made available to the user at 424. As can be seen, the name of the tab at 412 is the same as the name of the image button 422, both having been created from the same image button.

The automatic naming of the tab for a new control panel is quite useful, since the user is not burdened with the task of entering a name for the new tab. While this naming task may not be a problem for a traditional personal computer, or for a laptop or notebook computer, it represents an improvement for devices having limited user input, particularly in situations where the variety keyboard entry symbols are very limited, and entering names will thereby become quite difficult.

Figure 14:
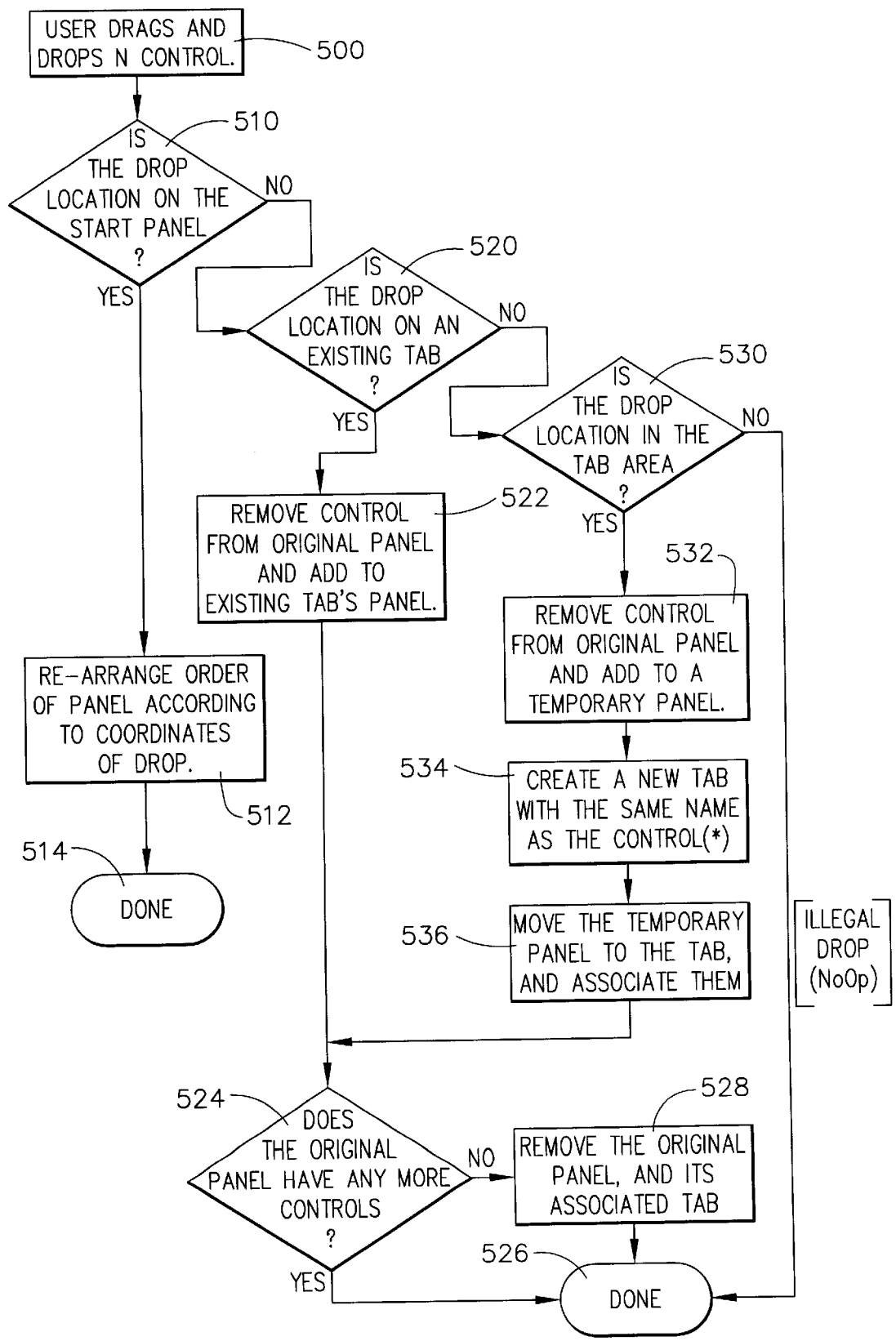
FIG. 14 is a flow chart depicting the major logical operations of the control drag and drop procedure used with the portable intelligent communications device of FIG. 1.

A flow chart depicting the logical steps for dragging and dropping control image buttons is provided on FIG. 14. Starting at a function block 500, the user drags and drops a image button, according to the same method as related above and as depicted in FIGS. 10–13. Now that the user has dropped the image button, a decision block 510 determines whether or not the dropped location is on the original control panel. This would correspond to the area that displays the control panel choices at 370 on FIG. 10. If the answer is YES at 510, then a function block 512 will re-arrange the order of the control panel image buttons according to the coordinates of the drop location. After that has occurred, this routine is finished, and returns at 514.

If the result at step 510 was NO, then a decision block 520 determines whether or not the drop location is onto an existing tab. If the answer is YES, then a function block 522 will remove the image button from the original panel and will add that image button to the new tab's panel. Once that occurs, a decision block 524 determines if the original panel has any remaining control image buttons. If the answer is YES, then this routine is finished, and returns at step 526. If the result at 524 is NO, then a function block 528 removes the original panel and its associated tab from the display.

If the result at decision block 520 was NO, then a decision block 530 determines if the drop location was in the tab menu area. If the answer is YES, then a function block 532 removes the image button from the original panel and adds it to a temporary panel. Then a new tab with the same name as the original control image button is created at a function block 534. The temporary panel is moved to the new tab location, and the tab and the control panel image button are now associated with one another, at a function block 536. After that has occurred, decision block 524 determines again whether or not the original panel has any remaining control image buttons.

If the result at decision block 530 was NO, then the drop placement was "illegal" and no operation will occur. This routine will then return at step 526.

It will be understood that various configurations or arrangements of tabs and image button controls other than illustrated herein can be implemented on a touch-sensitive display screen without departing from the principles of the present invention. Certainly, the control panel configuration could be arranged at locations other than along the top of the display, although it is preferred that the panel selections be placed in a substantially horizontal line so that the user's finger does not cover up some of the choices as the user is attempting to make a selection. The same is true with the tabs along the top of the display screen.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. In a computer system having a memory circuit, a processing circuit, and a touch-screen display, a method of providing a graphical user interface that supports finger navigation, said method comprising the steps of: displaying, under the control of said processing circuit, a plurality of virtual control buttons on said touch-screen display, said virtual control buttons being arranged on said display prior to selection in a manner such that each of said virtual control buttons is sufficiently spaced-apart from an adjacent of said virtual control buttons and is sufficiently large in surface area to allow actuation by a human finger without any one of said adjacent of said virtual control buttons being simultaneously actuated, wherein a portion of said plurality of virtual control buttons are arranged on said touch-screen display as a set of tab panel buttons that, when actuated, bring up a dialog.

2. The method as recited in claim 1, wherein the portion of said plurality of virtual control buttons that are arranged on said touch-screen display as a set of tab panel buttons are labeled as a first level of menu choices, and which, when actuated, each of said tab panel buttons creates a substantially horizontal row of control image buttons located below and adjacent to said first level of menu choices that are labeled as a second level of menu choices.

3. The method as recited in claim 2, further comprising the step of selecting, by a user, one of said control image buttons, after which a pre-determined function is performed by said computer system.

4. The method as recited in claim 3, further comprising the step of selectably moving the location on the touch-screen display of one of said control image buttons to a new location upon a control panel comprising the same set of substantially horizontal row of control image buttons that are labeled as a second level of menu choices, thereby re-ordering said control image buttons on that control panel.

5. The method as recited in claim 3, further comprising the step of selectably moving the location on the touch-screen display of one of said control image buttons to a new location upon a different control panel, thereby automatically creating a new control panel having a function and label substantially identical to the original control image button's function and label.

6. The method as recited in claim 3, further comprising the step of selectably moving the location on the touch-screen display of one of said control image buttons to a new location upon a tab menu area comprising said set of tab panel buttons which are labeled as a first level of menu choices, thereby automatically creating a new tab panel button having a function and label substantially identical to the original control image button's function and label.

7. The method as recited in claim 4, wherein said step of selectably moving the location on the touch-screen display of one of said control image buttons is accomplished by a drag and drop operation on said touch-screen display.

8. The method as recited in claim 5, wherein said step of selectably moving the location on the touch-screen display of one of said control image buttons is accomplished by a drag and drop operation on said touch-screen display.

9. The method as recited in claim 6, wherein said step of selectably moving the location on the touch-screen display of one of said control image buttons is accomplished by a drag and drop operation on said touch-screen display.

10. The method as recited in claim 1, further comprising the step of providing a cellular telephone that is in communication with said processing circuit, wherein data received by said cellular telephone is displayed on said display.

11. A computer system, comprising:
(a) a memory circuit for storage of data;
(b) a touch-screen display which acts as a graphical user interface that supports finger navigation; and
(c) a processing circuit tat is configured to control the flow of data between said memory circuit and said touch-screen display, and to control the appearance of information upon said touch-screen display by displaying a plurality of virtual control buttons on said touch-screen display, said virtual control buttons being arranged prior to selection on said display in a manner such that each of said virtual control buttons is sufficiently spaced-apart from an adjacent of said virtual control buttons and is sufficiently large in surface area to allow actuation by a human finger without any one of said adjacent of said virtual control buttons being simultaneously actuated, wherein a portion of said plurality of virtual control buttons are arranged on said touch-screen display as a set of tab panel buttons that, when actuated, bring up a dialog.

12. The computer system as recited in claim 11, wherein the portion of said plurality of virtual control buttons that are arranged on said touch-screen display as a set of tab panel buttons are labeled as a first level of menu choices, and which, when actuated, each of said tab panel buttons creates a substantially horizontal row of control image buttons located below and adjacent to said first level of menu choices that are labeled as a second level of menu choices.

13. The computer system as recited in claim 12, wherein said processing circuit is further configured to provide a selection capability of one of said control image buttons by a user, after which a pre-determined function is performed by said computer system.

14. The computer system as recited in claim 13, wherein said processing circuit is yet further configured to provide a user with a capability to selectably move the position on the touch-screen display of one of said control image buttons to a new location upon a control panel comprising the same set of substantially horizontal row of control image buttons that are labeled as a second level of menu choices, thereby re-ordering said control image buttons on that control panel.

15. The computer system as recited in claim 13, wherein said processing circuit is yet further configured to provide a user with a capability to selectably move the position on the touch-screen display of one of said control image buttons to a new location upon a second, different control panel on said touch-screen display, thereby automatically creating a new control panel having a function and label substantially identical to the original control image button's function and label.

16. The computer system as recited in claim 13, wherein said processing circuit is yet further configured to provide a user with a capability to selectably move the position on the touch-screen display of one of said control image buttons to a new location upon a tab menu area comprising said set of tab panel buttons which are labeled as a first level of menu choices, thereby automatically creating a new tab panel button having a function and label substantially identical to the original control image button's function and label.

17. The computer system as recited in claim 13, wherein said pre-determined function executed by said computer system is a web browser function which is actuable via said touch-screen display.

18. The computer system as recited in claim 13, wherein said pre-determined function executed by said computer system is a word processor function which is actuable via said touch-screen display.

19. The computer system as recited in claim 13, wherein said pre-determined function executed by said computer system is a cellular telephone dialer function which is actuable via said touch-screen display.

20. The computer system as recited in claim 19, further comprising a cellular telephone circuit integral to said computer system and in communication with said processing circuit and said memory circuit, wherein said pre-determined function executed by said computer system is a web browser function which is actuable via said touch-screen display, and is connected to a world wide communications system via said cellular telephone circuit.

21. A communications terminal, comprising:

(a) a telephony circuit;

(b) a memory circuit for storage of data;

(c) a touch-screen display which acts as a graphical user interface that supports finger navigation; and (d) a processing circuit that is configured to control the flow of data between said telephony circuit, said memory circuit, and said touch-screen display, and to control the appearance of information upon said touch-screen display by displaying a plurality of virtual control buttons on said touch-screen display, said virtual control buttons being arranged prior to selection on said display in a manner such that each of said virtual control button is sufficiently spaced-apart from an adjacent of said virtual control buttons and is sufficiently large in surface area to allow actuation by a human finger without any one of said adjacent of said virtual control buttons being simultaneously actuated, wherein a portion of said plurality of virtual control buttons are arranged on said touch-screen display as a set of tab panel buttons that, when actuated, bring up a dialog.

22. The communications terminal as recited in claim 21, wherein the portion of said plurality of virtual control buttons that are arranged on said touch-screen display as a set of tab panel buttons are labeled as a first level of menu choices, and which, when actuated, each of said tab panel buttons creates a substantially horizontal row of control image buttons located below and adjacent to said first level of menu choices that are labeled as a second level of menu choices.

23. The communications terminal as recited in claim 22, wherein said processing circuit is further configured to provide a selection capability of one of said control image buttons by a user, after which a pre-determined function is performed by said computer system.

24. The communications terminal as recited in claim 23, wherein said processing circuit is yet further configured to provide a user with a capability to selectably move the position on the touch-screen display of one of said control image buttons to a new location upon a control panel comprising the same set of substantially horizontal row of control image buttons that are labeled as a second level of menu choices, thereby re-ordering said control image buttons on that control panel.

25. The communications terminal as recited in claim 23, wherein said processing circuit is yet further configured to provide a user with a capability to selectably move the position on the touch-screen display of one of said control image buttons to a new location upon a second, different control panel on said touch-screen display, thereby automatically creating a new control panel having a function and label substantially identical to the original control image button's function and label.

26. The communications terminal as recited in claim 23, wherein said processing circuit is yet further configured to provide a user with a capability to selectably move the position on the touch-screen display of one of said control image buttons to a new location upon a tab menu area comprising said set of tab panel buttons which are labeled as a first level of menu choices, thereby automatically creating a new tab panel button having a function and label substantially identical to the original control image button's function and label.

27. The communications terminal as recited in claim 23, wherein said pre-determined function executed by said computer system is a web browser function which is actuable via said touch-screen display.

28. The communications terminal as recited in claim 23, wherein said pre-determined function executed by said computer system is a word processor function which is actuable via said touch-screen display.

29. The communications terminal as recited in claim 23, wherein said pre-determined function executed by said computer system is a cellular telephone dialer function which is actuable via said touch-screen display.

30. The communications terminal as recited in claim 29, wherein said telephony circuit comprises a cellular telephone circuit which is in communication with said processing circuit and said memory circuit, wherein said pre-determined function executed by said computer system is a web browser function which is actuable via said touch-screen display, and is connected to a world wide communications system via said cellular telephone circuit.

31. The communications terminal as recited in claim 21, wherein said telephony circuit comprises a cellular telephone that is in communication with said processing circuit, and wherein data received by said cellular telephone is displayed on said display.

32. The communications terminal as recited in claim 31, wherein said cellular telephone is in communication with said processing circuit and said memory circuit, and wherein a web browser function is executed by said computer system which is actuable via said touch-screen display, and is connected to a world wide communications system via said cellular telephone circuit.

* * * * *